Nov. 22, 1960  B. L. SNAVELY  2,961,547
SCANNING TRACE CONVERTER
Filed April 16, 1957  10 Sheets-Sheet 1

INVENTOR.
BENJAMIN L. SNAVELY
BY
ATTYS

Nov. 22, 1960   B. L. SNAVELY   2,961,547
SCANNING TRACE CONVERTER
Filed April 16, 1957   10 Sheets-Sheet 3

*INVENTOR.*
BENJAMIN L. SNAVELY
BY
ATTYS

Nov. 22, 1960 B. L. SNAVELY 2,961,547
SCANNING TRACE CONVERTER
Filed April 16, 1957 10 Sheets-Sheet 5

INVENTOR.
BENJAMIN L. SNAVELY
BY
ATTYS

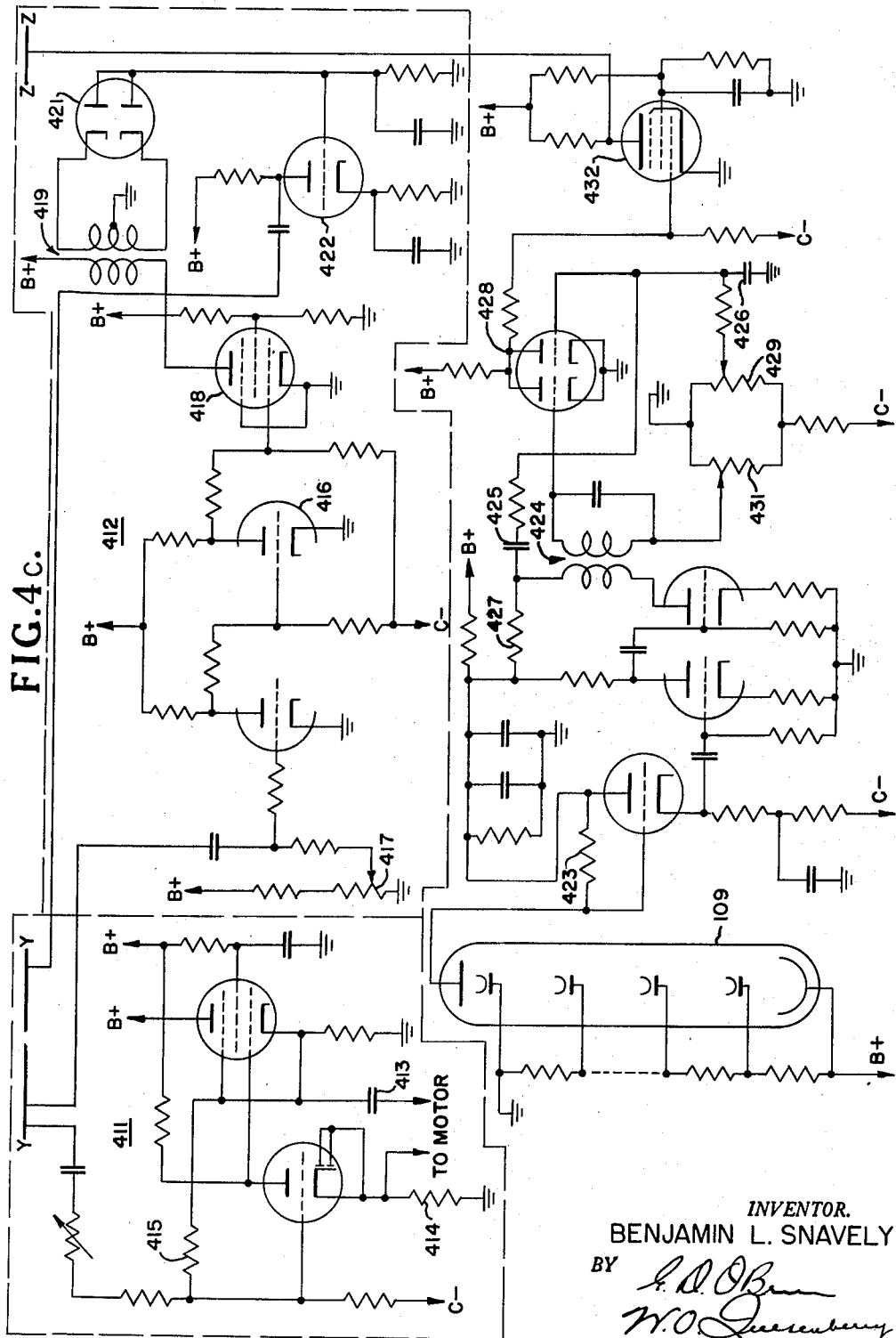

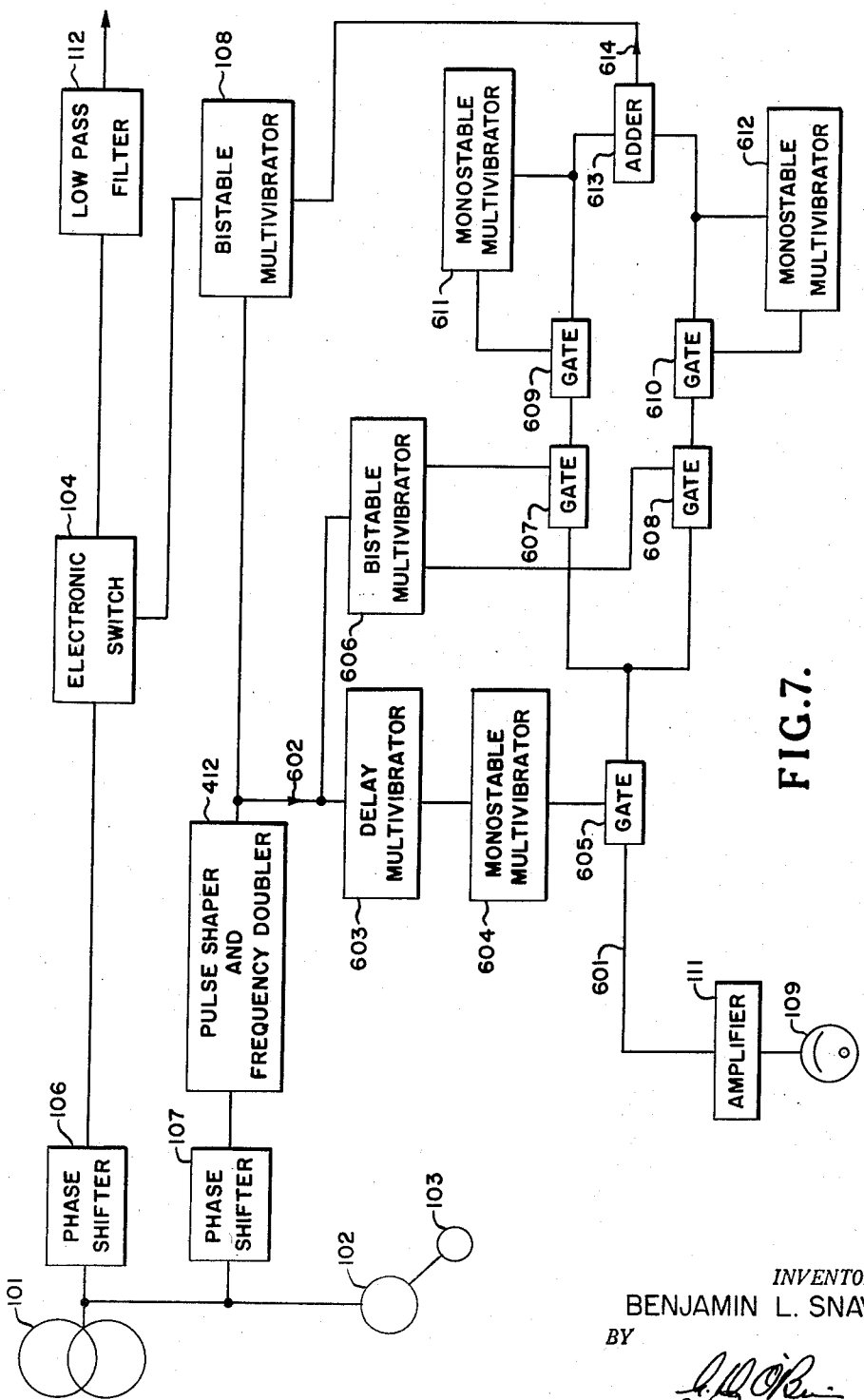

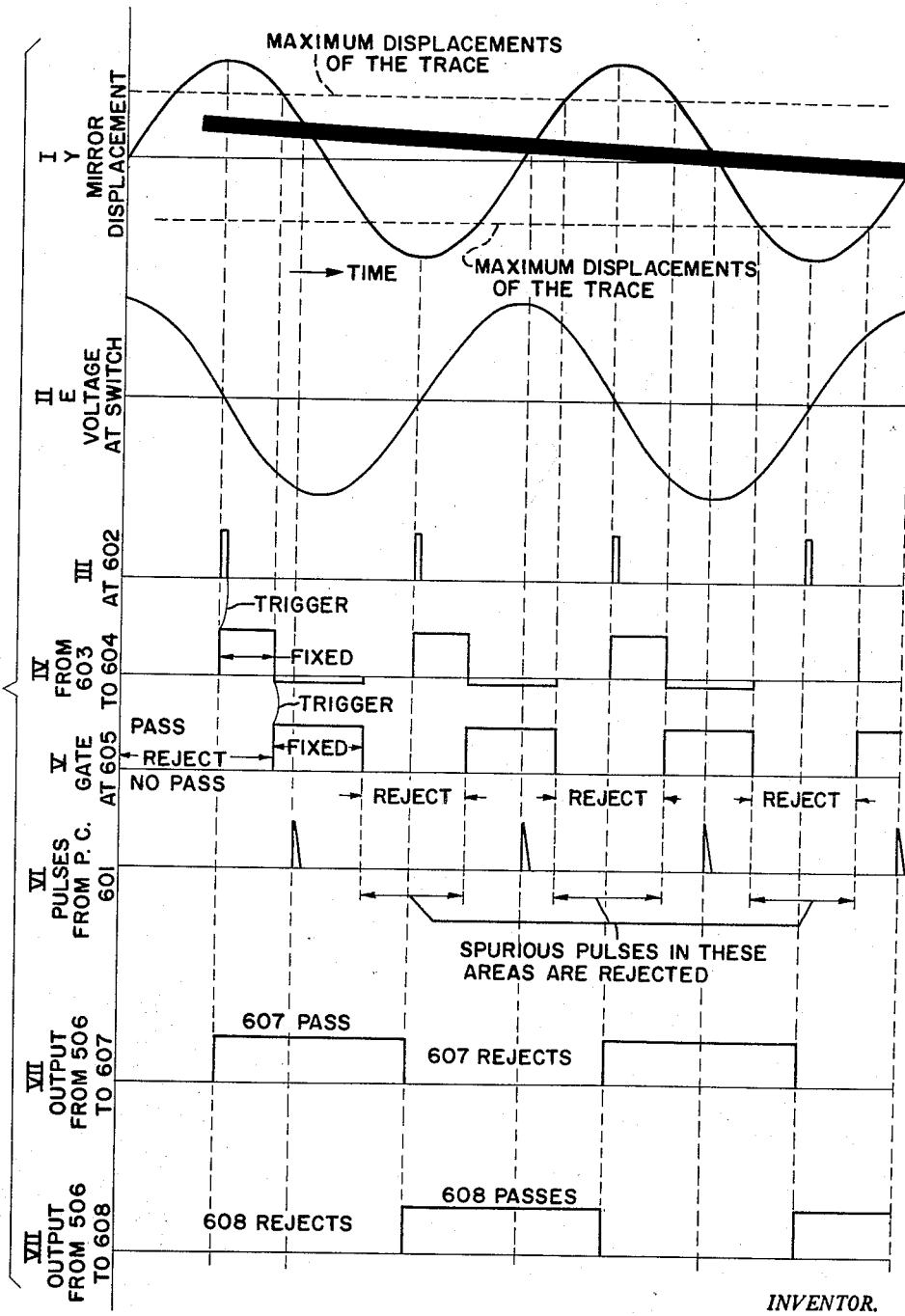

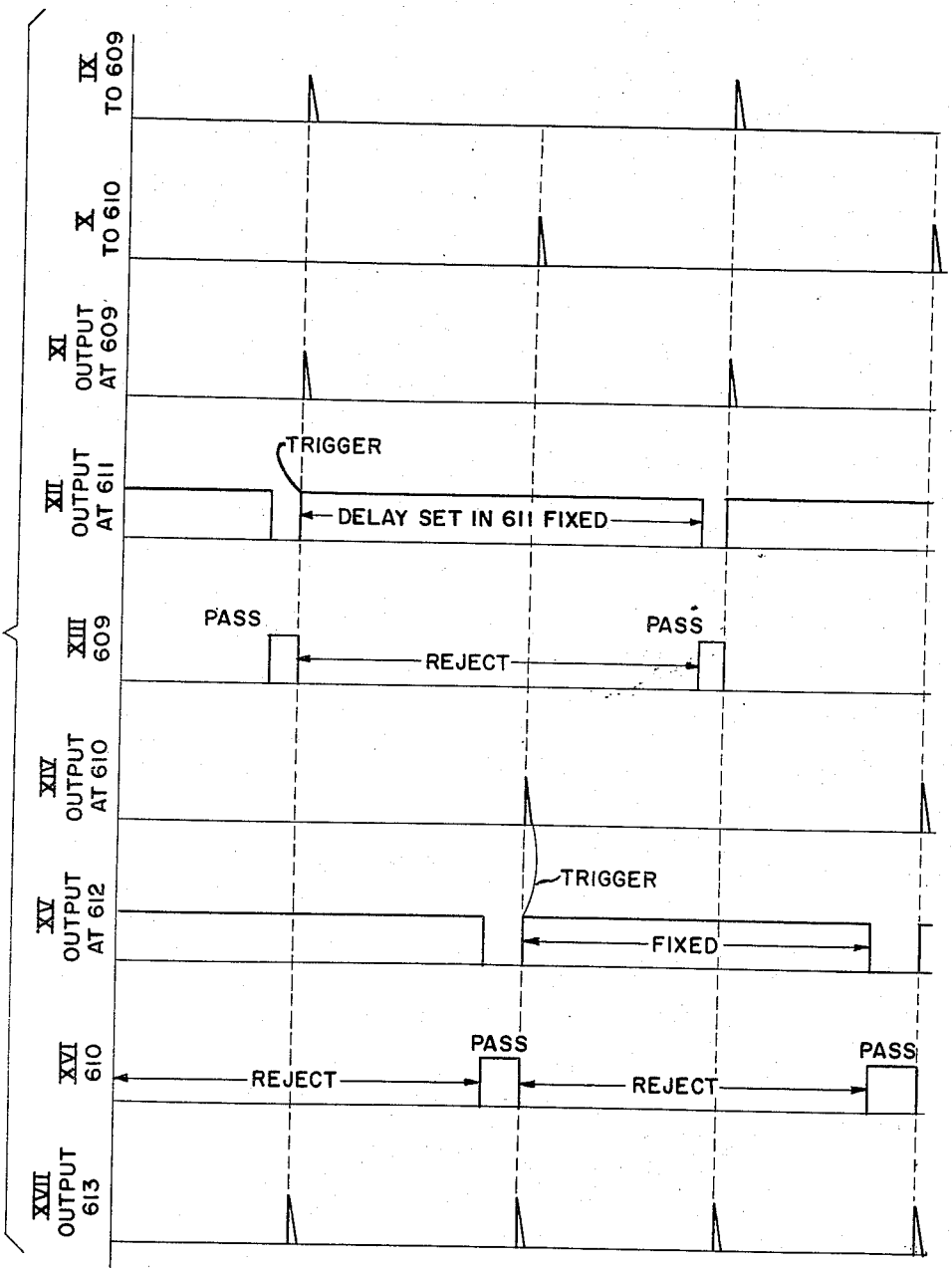

2,961,547

SCANNING TRACE CONVERTER

Benjamin L. Snavely, Takoma Park, Md., assignor to the United States of America as represented by the Secretary of the Navy Filed Apr. 16, 1957, Ser. No. 653,257

15 Claims. (Cl. 250—219)

(Granted under Title 35, U.S. Code (1952), sec. 266)

The invention described herein may be manufactured and used by or for the Government of the United States of America for governmental purposes without the payment of any royalties thereon or therefor.

The present invention relates to a scanning trace converter. More specifically, the present invention relates to a device for converting a trace which has been recorded on a tape into an electrical signal.

Devices of this character in the past have been known as curve followers, among other titles, and have consisted of a sensing stylus, which may be a beam of light, and which is moved by servomechanism so as to maintain contact with the curve traced. Curve followers or trace converters have been designed to be used with either transparent film or with a paper which is substantially opaque to light. In the first instance the trace converter may be designed to utilize the light transmitted through the film, whereas in the second case when light is used as a stylus, the trace converter must be designed to employ the reflected light from the surface of the paper or other material on which the trace is drawn. Such devices find their utility in such applications as recreating a signal which has been recorded as a result of some experiment and which it is desired to study in more detail and at greater leisure after the experiment has been performed. Curve followers are also vital parts of many types of computing machines and an important tool for the analysis of data recorded by pen writing or photographic recorders. It is even contemplated that in many instances curve followers can be used to replace relatively expensive mechanical cams used in many types of fire control equipment.

One of the difficulties which has existed with many of the prior devices of this character has been the relatively slow response time of servo mechanisms which have been required to follow the curve tracing. In those types of devices which employ a scan, there has existed the difficulty of producing a linear scan. Another difficulty which has been experienced by the prior art devices has been the production of spurious signals resulting from scratches or blemishes in the material on which the trace has been drawn.

The present invention employs a scanning system in which the scanning beam executes simple harmonic motion, or some other nonlinear periodic motion. In the simplest form of the present invention the scanning spot is effective during only half the cycle in locating the curve; during the other half cycle the spot returns to the position for the next scan. In general the present invention employs a source of energy having a higher frequency than that of the trace which is being scanned. This energy is employed to control the scan and is applied through an electronic switch to produce the output of the circuit. In operation the electronic switch is closed at the start of the scan and is opened by the first following interruption of the scanning beam by the curve. The switch then remains open until the beginning of the next cycle. During the time that the switch is closed the output from the source is passed through the switch and is integrated in the output circuit such that the output during each cycle is the time integral of the input evaluated over the interval during which the switch is closed.

The theory of operation of the present invention is based on the elementary integral calculus concept that the time integral of a cosine function is a sine function when the scanning beam is executing simple harmonic motion and the input of the electronic switch is a sinusoidal signal of the same frequency as the scan. Thus the total charge passed by the switch during any one cycle is the sinusoidal function of time required for the scanning beam to reach a displacement determined by the curve. Because the instantaneous displacement of the scanning beam is also a sinusoidal function of the time, the output can be made accurately proportional to the displacement of the curve from a certain reference position, provided that proper phasing is maintained between the motion of the scanning beam and the sinusoidal signal of the electronic switch. Since the scanning spot executes simple harmonic motion, the displacement from the center position is given, at a time $t$ after the passing of center position, by the relationship $$A \sin \left(2\pi \frac{t}{T}\right)$$

$A$ represents the maximum displacement of the spot and $T$ is the time required for one complete scanning cycle. If we suppose that $t_1$ is the time in which the scanning spot first intercepts the trace during a scanning traverse, and the $t_2$ is the time in which the trace is first intercepted on the return traverse, and that if $Y_1$ and $Y_2$ are the respective ordinates of the two intercepts of the trace then $$Y_1 \text{ equals } A \sin \left(2\pi \frac{t_1}{T}\right) \text{ and } Y_2 \text{ equals } A \sin \left(2\pi \frac{t_2}{T}\right)$$

The voltage applied to the electronic switch is in quadrature with the displacement of the scanning spot and at the instant in which the switch is closed coincides with the instant in which the scanning spot reaches its maximum deflection. These represent ideal conditions which are not very practical and need be only approximately maintained for satisfactory operation of the invention. If we let $\tau_0$ be the time between the instant at which the voltage applied to the electronic switch passes through zero and the instant at which the scanning spot is farthest from its zero, that is its center position and $E$ is the peak value of the voltage applied to the electronic switch, then the instantaneous value of this voltage is $$E \cos \left(2\pi \frac{t+\tau_0}{T}\right)$$

If $\tau'$ is the time interval between the instant at which the voltage applied to the electronic switch passes through zero and at the instant at which the switch is turned on then the average voltage output is:

$$v = \frac{1}{T} \int_{-\frac{T}{4}-\tau_0+\tau'}^{t_1} E \cos \left[\frac{2\pi}{T}(t+\tau_0)\right] dt$$

This may be reduced:

$$v = \frac{E}{2\pi}\left[\sin \frac{2\pi}{T}(t_1+\tau_0) - \sin \frac{2\pi}{T}\left(-\frac{T}{4}+\tau'\right)\right]$$

$$= \frac{E}{2\pi}\left[\sin \frac{2\pi}{T}t_1 \cos \frac{2\pi}{T}\tau_0 + \cos \frac{2\pi}{T}t_1 \sin \frac{2\pi}{T}\tau_0 + \cos \frac{2\pi}{T}\tau'\right]$$

$$= \frac{E}{2\pi}\left[\frac{Y_1}{A} \cos \frac{2\pi}{T}\tau_0 + \sqrt{1-\frac{Y_1^2}{A^2}} \sin \frac{2\pi}{T}\tau_0 + \cos \frac{2\pi}{T}\tau'\right]$$

For sufficiently small values of $\tau_0$ this becomes:

$$v = \frac{E}{2\pi}\left[\frac{Y_1}{A} + \cos\frac{2\pi}{T}\tau'\right]$$

Since $\tau'$ is constant this equation shows that insofar as $\tau_0$ is negligible the average voltage from the electronic switch is a linear function of the ordinate of one edge of the trace.

A more efficient form of the invention utilizes both directions of the scan to modulate the output signal. In this type of operation the electronic switch is turned on twice each cycle and is then turned off for each crossing of the trace of the scanning spot. Suppose that $\tau'$, as before, is the time interval in a given cycle between the instant at which the voltage applied to the electronic switch passes through zero in a given direction and the instant at which the switch is turned on and let $\tau''$ be the corresponding time interval for the second half of the same cycle so that $\tau''$ is the time interval between the instant at which the voltage next passes through zero, in the opposite direction, and the instant when the switch is again closed then if $t_1$ and $t_2$ are the times at which the switch is turned off, corresponding to the times at which the scanning spot is intercepted by the trace, the average output from the electronic switch during the cycle is:

$$v = \frac{1}{T}\int_{-\frac{T}{4}-\tau_0+\tau'}^{t_1} E\cos\left[\frac{2\pi}{T}(t+\tau_0)\right]dt$$

$$+ \frac{1}{T}\int_{\frac{T}{4}-\tau_0+\tau''}^{t_2} E\cos\left[\frac{2\pi}{T}(t+\tau_0)\right]dt$$

$$= \frac{E}{2\pi}\left[\sin\frac{2\pi}{T}(t_1+\tau_0) - \sin\frac{2\pi}{T}\left(-\frac{T}{4}+\tau'\right)\right.$$

$$\left.+ \sin\frac{2\pi}{T}(t_2+\tau_0) - \sin\frac{2\pi}{T}\left(\frac{T}{4}+\tau''\right)\right]$$

$$= \frac{E}{2\pi}\left\{\frac{1}{A}(Y_1+Y_2)\cos\frac{2\pi}{T}\tau_0 + \left[\sqrt{1-\frac{Y_1^2}{A^2}}\right.\right.$$

$$\left.\left.+ \sqrt{1-\frac{Y_2^2}{A^2}}\right]\sin\frac{2\pi}{T}\tau_0 + \cos\frac{2\pi}{T}\tau' - \cos\frac{2\pi}{T}\tau''\right\}$$

In this equation the radicals representing $$\cos\frac{2\pi}{T}t_1$$

and $$\cos\frac{2\pi}{T}t_2$$

respectively must have opposite signs. Now $\tau_0$, $\tau'$ and $\tau''$ can all be made small. Also, in almost all cases, the width of the trace is small compared to the scanning amplitude A so that $Y_1$ will be nearly equal to $Y_2$. Under these circumstances we shall have, to a very good approximation that $v$ is equal to $$\frac{E}{\pi A}Y \text{ average where } Y \text{ average} = \frac{1}{2}(Y_1+Y_2)$$

It is evident that Y average is the ordinate of the center of the trace at a time between $t_1$ and $t_2$. From the above theoretical discussion, it is evident that the overall performance of these devices would be essentially the same, except for trivial differences in algebraic sign, if the electronic switch were closed by pulses derived from the trace and opened at regular recurring instances by pulses from the source. In fact it is possible to replace the electronic switch with a commutator which, instead of making the input connection to the output integrating circuit, reverses these connections at each impulse derived from either the trace or the source. For a given set of operating conditions the commutator system gives twice the output of a system employing an off and on switch. It is also evident from the foregoing theoretical discussion that since the peak voltage E and the maximum displacement A are both directly proportional to the output voltage and since they occur in the numerator and denominator respectively, the output voltage is independent of the oscillator voltage or the source voltage, provided that the amplitude of the trace curve falls within the scanning amplitude.

It is an object of the present invention to provide a trace converter employing a non-linear periodic scanning motion.

It is another object of the present invention to provide a trace converter having a high speed of response.

It is another object of the present invention to provide a trace converter which minimizes the effect of spurious markings on the trace carrying medium.

Other objects and features of the present invention will become apparent from the disclosure made in the following detailed description of a preferred embodiment of an invention and illustrated in the accompanying drawings in which.

Figure 1:
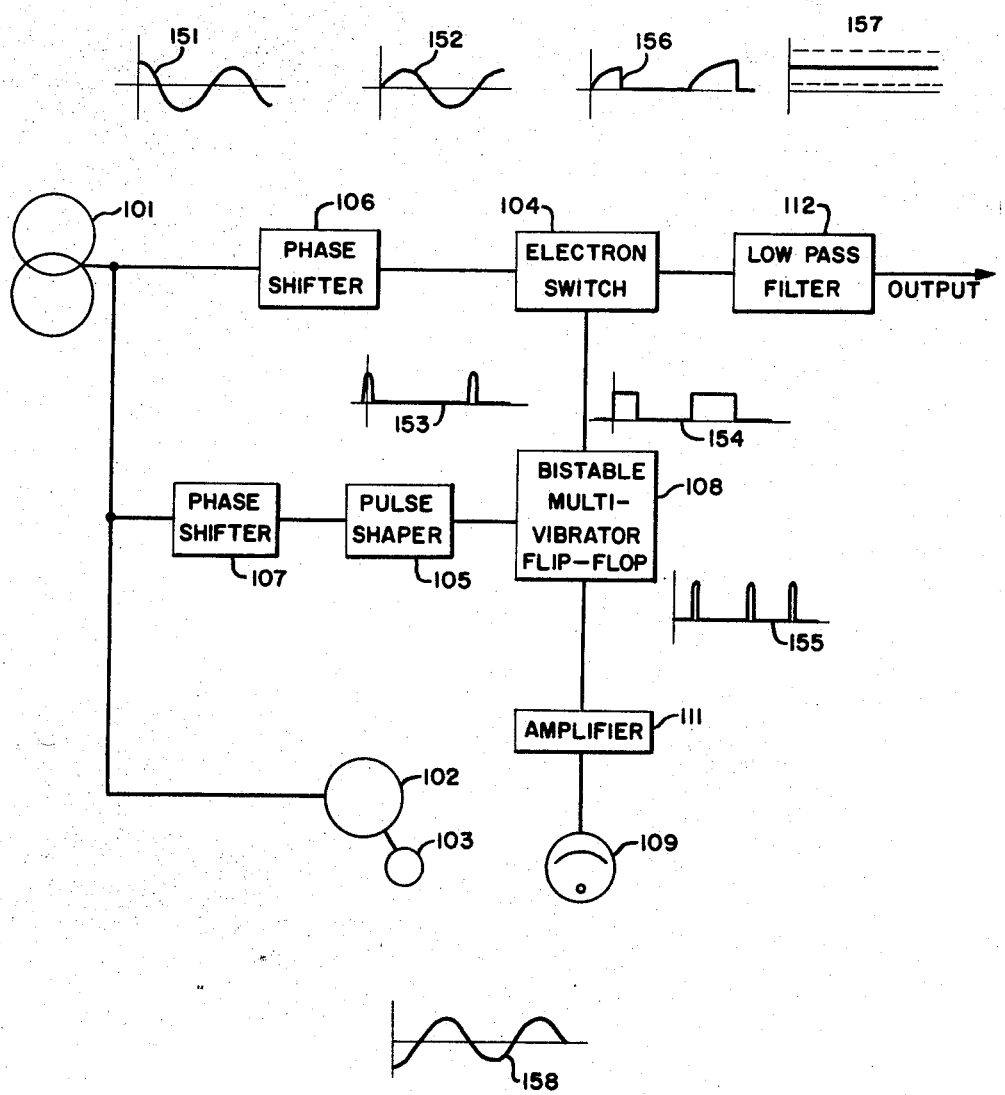
Fig. 1 is a block diagram illustrating a simplified form of the invention.
Figure 5:
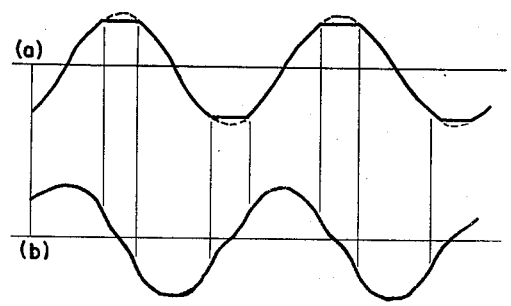
Figure 4A:
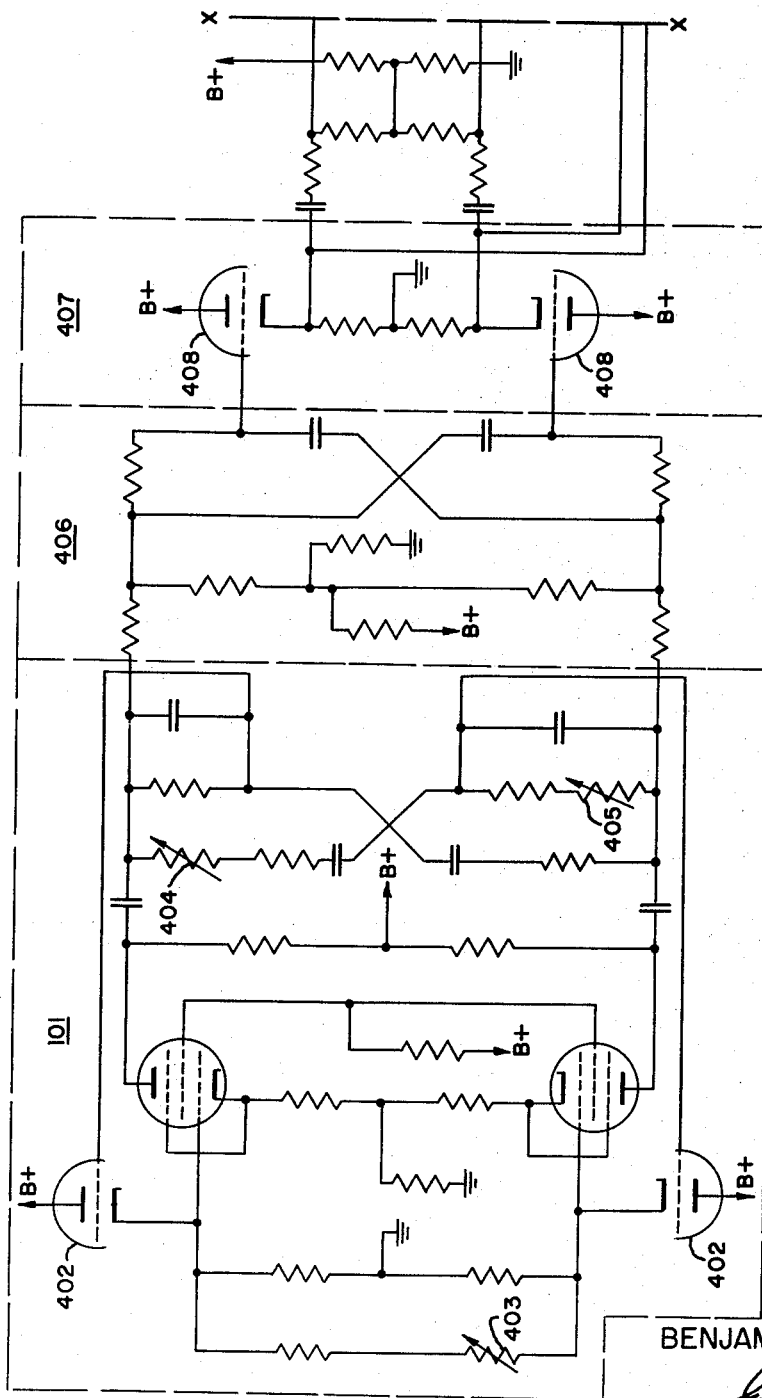
Figure 4B:
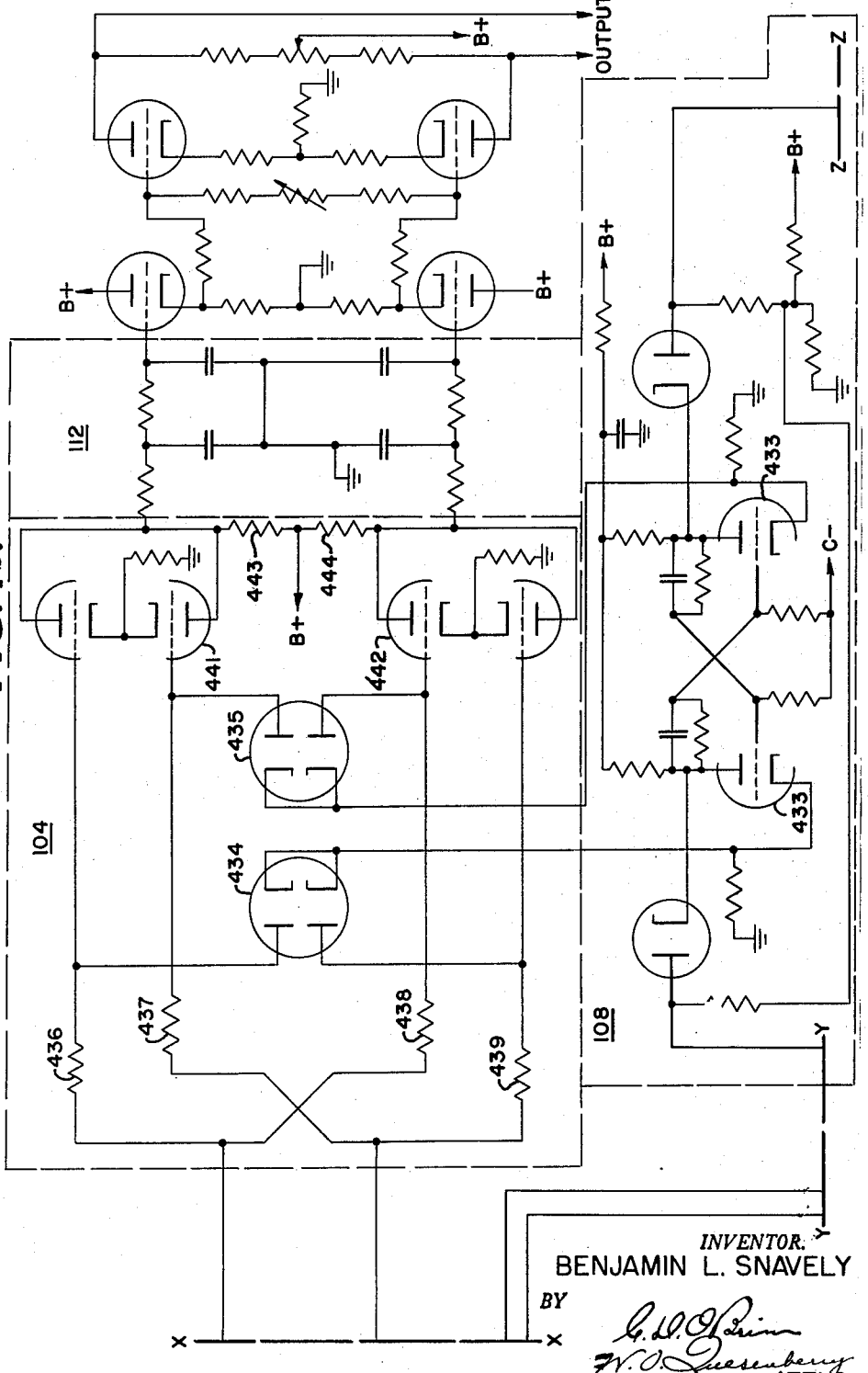
Figure 6:
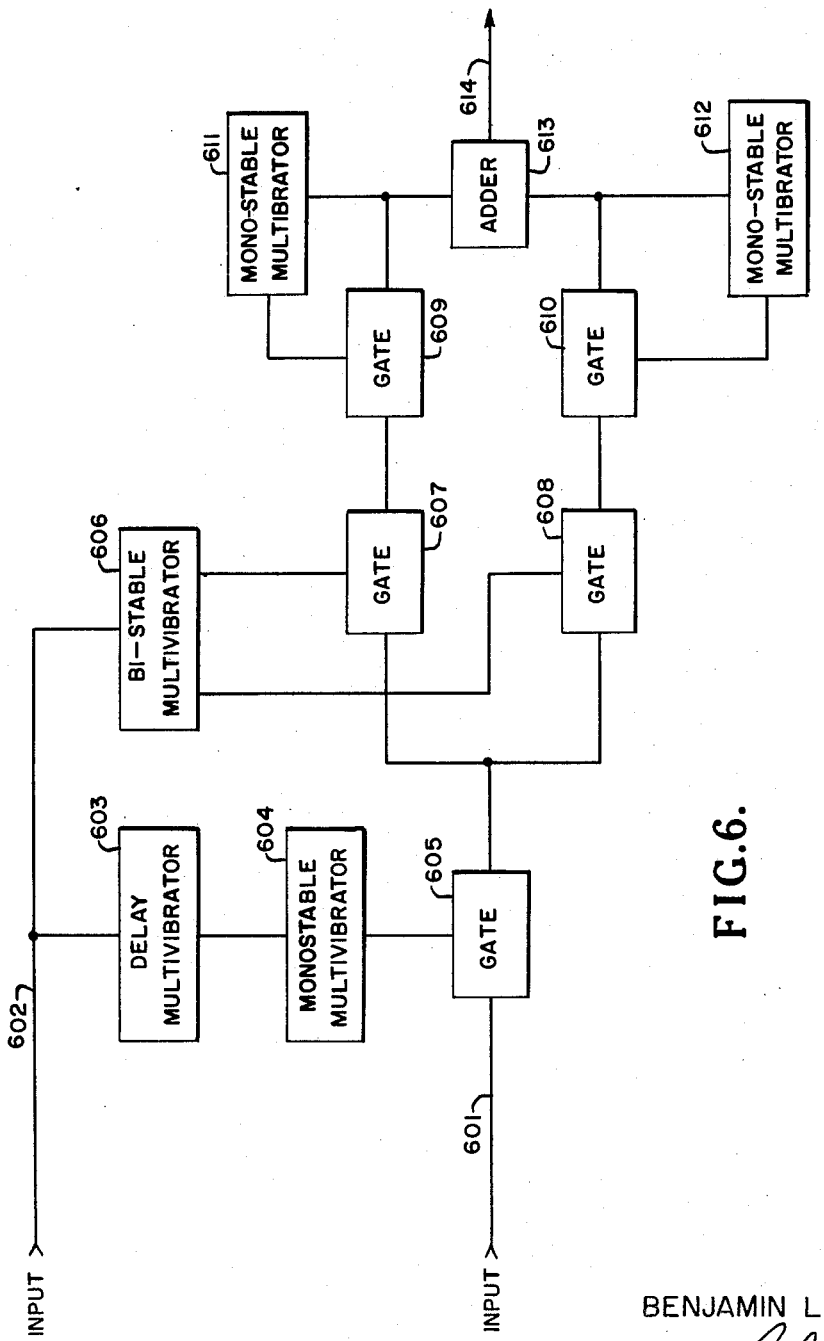

Figs. 4a, 4b and 4c constitute a schematic diagram of an electrical circuit of a preferred embodiment of the invention;

Fig. 5 is a graph showing the effect of phase shift on distortion;

Fig. 6 is a block diagram illustrating a gating circuit for use in the present invention to eliminate spurious signals;

Fig. 7 is a block diagram illustrating the gating circuit of Fig. 6 as applied to the simplified illustration such as shown by the block diagram of Fig. 1; and Figs. 8a and 8b constitute a time sequence chart for the operation of the present invention.

Referring now to the drawings wherein like reference characters designate like or corresponding parts throughout the several views, there is shown in Fig. 1 a block diagram illustrating the present invention together with a showing of various wave forms present in the system when operating. In this embodiment the oscillator 101 produces an output having a sinusoidal voltage curve shown at 151. The output of oscillator 101 is applied to drive a vibration motor 102 which vibrates concave mirror 103 to produce the scan for the system having a displacement as shown by curve 158. The output of oscillator 101 is also applied to a pulse shaper 105. This quadrature relationship between the displacement of the scan produced by the mirror 103 and the voltage applied to the switch 104 and to the pulse shaper 105 may be accomplished incident to the design of the overall circuit such as occurs in the circuitry of Fig. 4, or it may be accomplished by the introduction of special phase shifter circuits, as shown in block diagram of Fig. 1 at 106 and 107. In the diagram as shown in Fig. 1 the pulse shaper 105 produces a pulse, shown by curve 153, each time the quadrature voltage passes through zero in a particular direction. This pulse is used to trigger a bistable multivibrator 108 into one of its two stable conditions. The bistable multivibrator 108 remains in its first triggered state until it is again triggered by a pulse from the photocell 109 of scanning system, which pulse is shown as amplified at 155 is applied through an amplifier 111. The pulse 155 from photocell 109 is produced by the passage of the scan over the trace and results in the opening of the switch 104 which had been previously closed by the pulse 153 from the pulse shaper 105 acting on the multivibrator 108. During the time which switch 104 has been closed, the quadrature voltage from the oscillator 101 has been passed to the low pass filter 112. Filter 112 functions during the operation of the trace converter to integrate the segments of the sinusoidal wave passed by the electronic switch 104 and produces an output which is the time interval of the sinusoidal input, evaluated over the interval during which the switch is closed.

The voltage output of the phase shifter 106 is shown by curve 152 to be in quadrature with the curve representing the voltage output of the oscillator at 151. The same would be true of the output of phase shifter 107. The output voltage of the pulse shaper 105 is shown at 153 as occurring when the voltage output of the phase shifters is moving in a positive direction. This means that since the voltage output from the phase shifter is stated to be in quadrature with the scan, that the pulses produced by the pulse shaper occur near the instant that the scanning spot has its maximum deflection toward one side of the tape. The circuit is also designed so that the pulses from the pulse shaper 105 always triggers the bi-stable multivibrator 108 to a certain one of its stable states. The output of multivibrator 108 is the square wave, such as shown by 154 in Fig. 1, whose pulse width is determined by the time interval between the pulses received from the pulse shaper and those from the photocell 109. As may be noted from the curve at 156, these pulses may vary in their time spacing. It therefore follows that the portion of the wave form from oscillator 101 which is transmitted by the electronic switch 104 will vary in accordance with the length of the pulses from the multivibrator 108. This may be noted in curve 157. Low pass filter 49 removes the high frequency components introduced by the electronic switch so that the output voltage will correspond to the position of the trace at any given instance. This is shown in curve 157 which is shown as substantially a straight line. As stated earlier in the specification, the frequency of the scan is higher than the frequency variation of a trace. The displacement curve for the scan is shown at 158.

It will be noted that the system illustrated in Fig. 1 and just described utilizes only one half of the pulses generated in the photocell by the scanning spot. This system could be adapted to utilize all the pulses generated in the photocell as a result of the scan crossing the trace by introducing into the pulse shaper circuit a frequency doubling circuit. This renders the system more efficient and increases the amplitude of the output.

Figure 2:
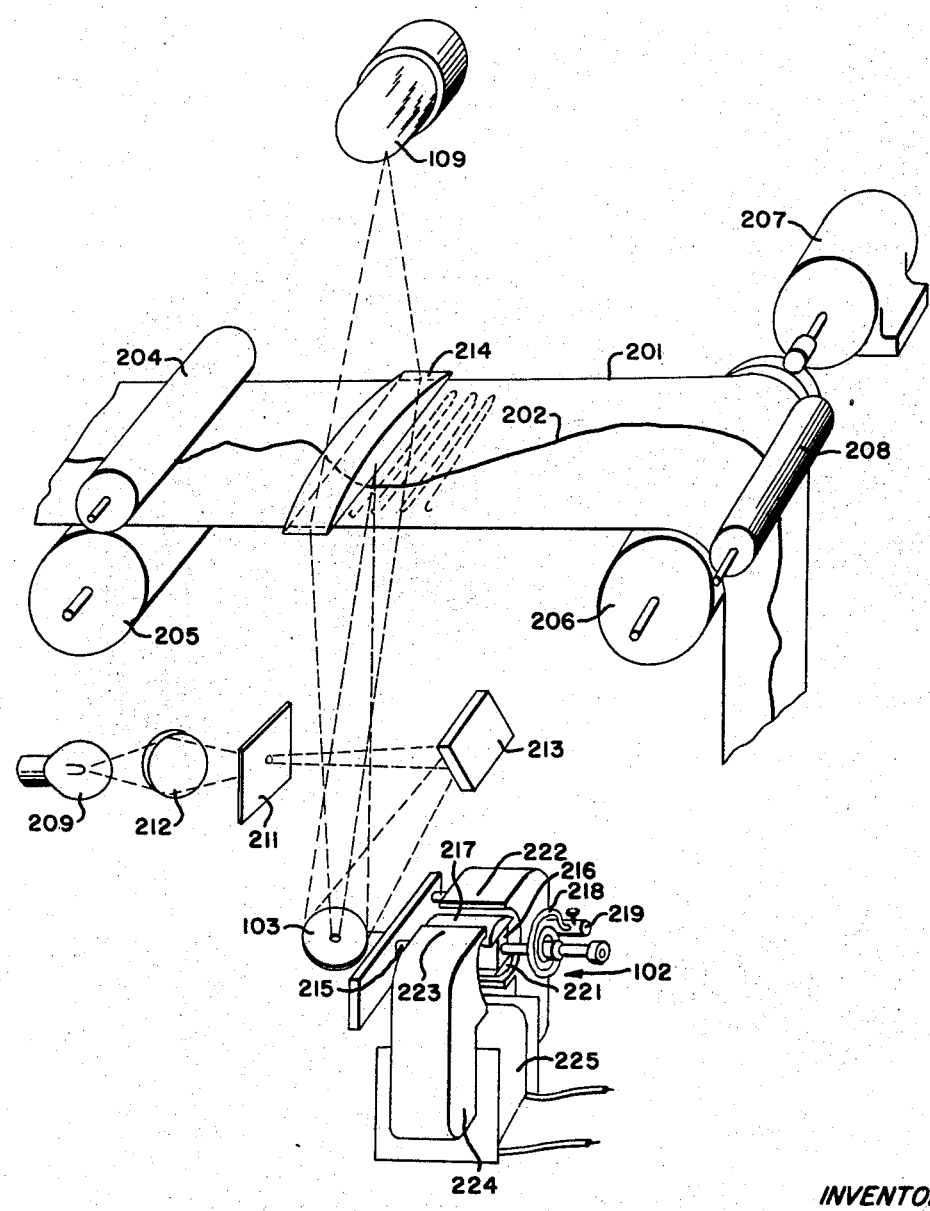
Fig. 2 is a pictorial representation of an optical scanning system for transparent tape.

An optical scanning system for use with the trace converter, such as shown in the Fig. 1 and previously described, is shown in Fig. 2 where the tape 201 carrying a trace 202 is positioned to pass between tensioning rollers 204 and 205 and over a roller 206 which is driven at a substantially uniform speed by a motor 207, the tape being held against the roller 206 by an idler roller 208. In this system the optical system is designed for use with a transparent tape on which the trace appears as an opaque line. The system consists of a source of light 209 which is focused through a small aperture in a plate 211 by a lens system 212 onto a plane mirror from whence it is reflected onto the vibrating mirror 103. The vibrating mirror causes a shaft of light to move transversely of the tape and at right angles to the direction of motion of the tape as the mirror vibrates. The light as it passes through the tape is caught by a lens 214 and focused on the photocell 109 to produce the pulse which triggers the multivibrator 108. To produce the vibration of mirror 103 it may be fixed to the shaft of the vibrating motor 102. The motor 102 has a shaft 215 on which is mounted a permanent magnet 216 which with its soft iron pole pieces 217 constitutes the armature for the motor 112. The shaft 215 carries at the end opposite that on which the mirror is attached, a spiral spring 218. The spiral spring 218 has one end attached to the shaft and the other attached to the fixed support 219. This spring is adjusted so that with the shaft and the mirror at rest and with no forces applied, the mirror focuses an image of the aperture 211 on the center line of the film. The armature 221 is mounted between the poles 222 and 223 of the yoke 224 which is made of laminated soft iron. The magnetic field of the permanent magnet 216 is at right angles to the shaft so that the pole pieces 216 and 217 are of opposite magnetic polarity and this armature when at rest is positioned so that its poles 216 and 217 span the gap between the poles 222 and 223 of the yoke. The yoke 224 carries a coil 225 which, in the system of Fig. 1 is connected to the output from the oscillator 101 to produce an alternating magnetic field between the poles 222 and 223. This alternating magnetic field acts on the transversely placed armature 221 to produce an alternating torque. This torque produces the vibration of the mirror which has its frequency determined in part by the natural frequency of the vibrating system as determined by its moments of inertia and the stiffness of its spring 218 and by the frequency of the alternating field. If the frequency of the alternating field is close to that of the natural frequency of the system, a small current in the coil 225 will produce a relatively large angular vibration of the armature shaft and mirror and if the vibrating system has small damping, that is relatively little friction, the vibration will be nearly sinusoidal even though the alternating current may depart widely from a pure sine wave.

The forward motion of the film combined with the transverse motion of the scanning spot produced by the mirror, produces a scanning action following a sinusoidal path.

Figure 3:
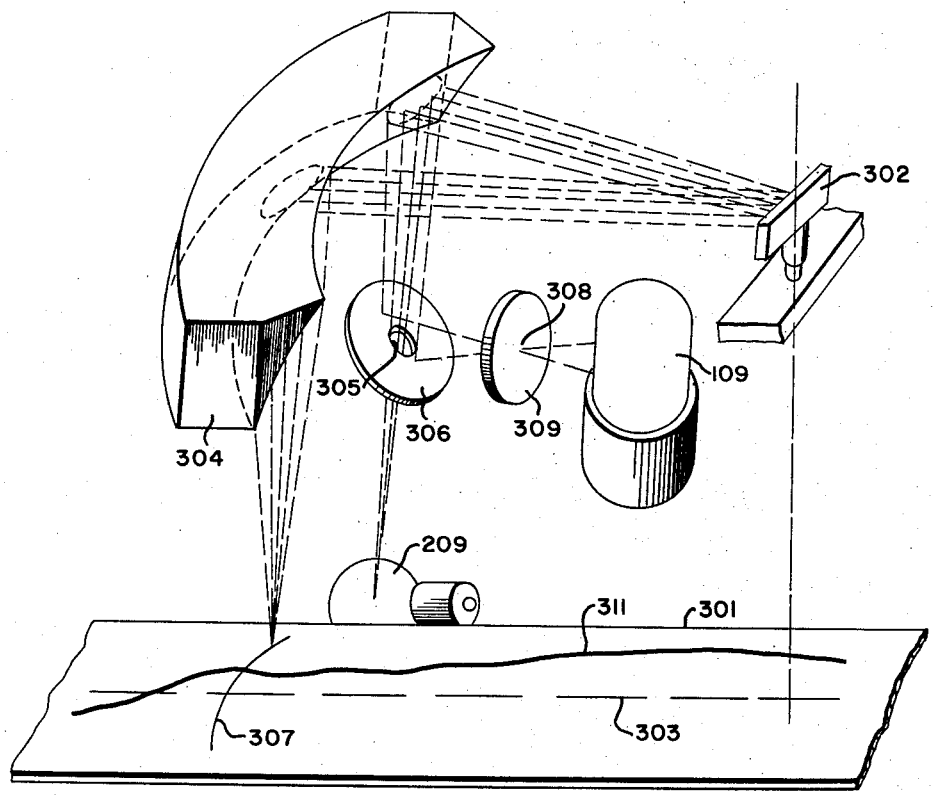
Fig. 3 is a second optical system for scanning opaque tape having linear coordination.

The optical system illustrated in Fig. 3 is designed for use with an opaque tape. More particularly, the system of Fig. 3 is designed to be used with tape in which the recording stylus has moved in a circular arc so that the resulting record is in curved linear coordinates. Such recording can be accurately reproduced only if the scanning spot has a path which accurately corresponds to the path of the recording stylus. In Fig. 3 the tape 301 on which the trace is inscribed may be assumed to be moved by a system similar to that employed in Fig. 2 to move the tape 301 and the mirror 302 may be assumed to be driven by a vibrating motor such as shown in Fig. 2. The axis of rotation for the vibrating mirror 302 is made perpendicular to the plane of the tape 301 and is made to pass through the center line of the tape, or through the reference line chosen for the particular trace on the tape. The axis of the mirror 302 is made to pass through or substantially through the reflecting surface of the mirror to establish the center of scan in correspondence to the center or reference line 303. A fixed mirror 304 has a reflecting surface which may be a part or a zone of a sphere whose center of curvature is located on an extension of the axis of rotation of mirror 302. For optimum focusing, the center of curvature of mirror 304 should be at the intersection of the center or reference line with the projected oscillation axis of the mirror 302 and should have a radius $\sqrt{2}$ times the radius of the scanning arc with the light rays from mirror 302 to 304 beam parallel to the plane of the trace. The mirror 304 is positioned to reflect the light which originated at the source 209 and passes through an aperture 305 in a mirror 306 onto the vibrating mirror 302 and receives the reflected light from the mirror 302 which has been reflected onto the tape to form the scanning path across the tape indicated at 307 in Fig. 3. Mirror 304 also functions to receive the light reflected from the tape back on the reflecting mirror 302 where it is again reflected onto the mirror 304. From mirror 304 the reflected light from the tape is reflected onto mirror 306. Since the beam of light which is reflected back from the tape and reaches the mirror 306 is wider than the aperture 305, a portion of the beam will be reflected through an aperture 308 in a member 309 into the photocell 109.

The circuit details of the electrical circuit associated with the trace converter of the present invention are shown in Figs. 4a, b and c. The details of the power supply system from which the voltage is necessary for the operation of the system have not been shown because the design of such power supply is well known in the art. The circuit, as described, utilizes the frequency doubler mentioned in the connection with the description of Fig. 1, so that the system is responsive to interruptions of the light beam by the trace in both directions of the scan. While the circuit detail described will be a preferred embodiment, it is to be understood that such details circuits are illustrated only and that the functions of the circuits may be performed by circuits which differ widely from the details described, which are shown in Fig. 4.

The circuit in Fig. 4a, employs an oscillator 101 which has a feedback circuit of the so-called Wien bridge type. The oscillation amplitude is stabilized by the limiting action due to the cut off of the voltage peaks occurring in the double triode 402. The output voltage from the oscillator is adjustable by means of the adjustable resistor 403, which controls the point where cut-off occurs. The adjustable resistors 404 and 405 permit slight adjustments in the frequency and feedback of the oscillator. The output of the oscillator 101 is fed into a phase shifting network 406. This phase shifting network is to be distinguished from the phase shifters, 106 and 107, shown in Fig. 1, whose function in the present circuit is accomplished by the circuit constants rather than by separate circuits for phase shifting. The phase shifter 406 is introduced into the circuit to achieve high accuracy in the operation of a trace converter by providing for the trace converter to operate on that portion of the oscillator wave form which is most accurately sinusoidal. This result is achieved by the phase shifter because in a normal operation of the oscillator the greatest amount of distortion is introduced into the wave form by the clipping of the pulse voltage peaks in the oscillator. Therefore, by shifting the phase approximately 90° the distortion occurs near the zero voltage level of the wave form and therefore lies outside of the portion of the cycle utilized by the converter, a substantial improvement in the trace converter performance is achieved. This effect is illustrated in Fig. 5. In Fig. 5 curve (a) represents the normal output from the oscillator with its slightly clipped peaks, which occur substantially in that portion of the curve which it is desirable to utilize in the trace converter and curve (b) represents the phase shifted wave form.

The output of the phase shift network 406 is utilized to drive a buffer amplifier 407 which consists of a double triode 408 connected to provide a cathode follower output in push-pull thus providing a low impedance output which is utilized to drive the switch 104, the power amplifier 411 and the frequency doubler and pulse shaper 412.

The power amplifier 411 is used to drive the motor 102 for vibrating the mirror 103 or 302. Since the motor 102 produces a back E.M.F. proportional to the instantaneous velocity of the vibrating mirror, it is possible to achieve quadrature between the mirror displacement and the amplitude of the voltage curve, either by making the internal impedance of the motor negligible or by making the internal impedance of the driving source equal and opposite to the internal impedance motor. Under these conditions the quadrature of the mirror displacement and the voltage will be independent of the relationship between the driving frequency and the mechanical resonance of the motor system. In the amplifier 411, the series condenser 413 is chosen to neutralize the reactance of the motor winding while positive feedback is introduced by the resistor 414. By proper choice of this resistor, the output resistance of amplifier 411 may be made approximately equal in magnitude to the resistance of the resistant motor. Stabilization of the amplifier 411 is achieved by the negative feedback introduced by the resistance 415.

The voltage doubler circuit 412 includes a double triode 416 which converts the signal applied to the frequency doubler 412 into a square wave. Symmetry of the wave is obtained by the proper choice of the bias on the first grid of 416. This bias is controlled by the potentiometer 417. The square wave from 416 is amplified in tube 418 and is applied to the transformer 419. This produces in the secondary of the transformer 419 positive and negative pulses which are rectified by the tube 421 and appear at the grid of an amplifying tube 422 as negative pulses of double the frequency of the applied signal to the tube 416. After amplification and inversion in the tube 422 the pulses are applied to one side of "flip-flop" or bi-stable multivibrator 108 as positive pulses which are nearly coincident in time with the zeros of the voltages applied with the input of switch 104.

It will be noted that in the special design of the amplifier 411 and the frequency doubler and pulse shaper 412 automatically insure the correct phase relationship between the signal applied to the switch 104 and the motion of the mirror 103 and also the correct phase relation between the signal applied to the switch and the pulses applied to the flip-flop 108 by the pulse shaper 412. Thus phase shifters 106 and 107, indicated in Fig. 1, are unnecessary. With a different type of motor drive or a different type of pulse shapers, phase shifters may be required.

Referring again to Fig. 4c the current through the photocell 109 is proportional to the light in the scanning spot which traverses the tape 201 or 301 in Figs. 2 and 3 respectively. Thus the current in resistance 423 is normally reduced each time the scanning spot intercepts the trace 202 or 311 in Figs. 2 and 3 respectively. The resulting voltage pulse, after amplification, appears in the secondary of transformer 424. The secondary of the transformer 424 forms a part of a resistance capacitance network having a time constant chosen to produce a maximum output for pulses of the width produced when the path of the scanning spot is nearly at right angles to the trace. However, this circuit strongly discriminates against much longer pulses which are produced when the scanning path is nearly tangential to the trace. These longer pulses are accepted by the circuit consisting of the condensers 425 and 426 and the resistor 427. This latter circuit is fed directly from the amplifying stage preceding the transformer 424. The long and short pulses are respectively applied to the grids of the double triode 428 which has its plates in parallel and its cathode in parallel. Both types of pulses appear positive at these grids. The biases on the grids of 428 are adjusted by means of potentiometers 429 and 431 so that these tubes are normally cut-off. The pulses from 428 are amplified by tube 432 and delivered to the flip-flop or multivibrator circuit 108 as positive pulses.

The flip-flop of multivibrator circuit 108 has two stable positions, in each of which one of the triodes of the double triode 433 is conducting while the other is cut-off. Because the theory of bi-stable circuits is well known, the operation of the flip-flop or multivibrator will not be described in detail. In the present circuit, the multivibrator 108 is triggered to one of its stable states by the pulse from the frequency-doubler-and-pulse-shaper and into the other of its stable states by the pulse from the phototube 109. The circuit constants in the multivibrator 108 and in the switch 104 are so chosen that at a given instant between pulses the cathode potential of one of the double diodes 434 and 435, which form the part of the switch 104, is considerably above the instantaneous plate potential of that diode, while in the other of these diodes the cathode potential is considerably below the corresponding instantaneous plate potential. As a result one of the double diodes will be conducting while the other is non-conducting. The current drawn by conducting diode causes sufficient drop across the corresponding resistance in the group of resistances 436, 437, 438 and 439 to reduce the grid potential of the respective grids of double triodes 441 and 442 below the cut-off point. Thus, at a given instant, excepting the extremely short interval while the flip-flop or multivibrator is being triggered from one of its stable positions to the other, only one of the triodes in each of the double triodes 441 and 442 will be conducting. It is evident from the circuit configuration that the conducting triodes will be driven by signals from the buffer amplifier 407 so that a push-pull signal will appear across the resistors 443 and 444, and it will be noted that the signal across these resistors will change phase by 180 degrees each time the multivibrator 108 reverses its position. In other words, this switch 104 acts essentially as the commutator between the buffer amplifier 407 and the low pass filter 112.

The low pass filter 112 has a cut-off frequency well below the frequency of the oscillator 101, but still well above the frequencies of the trace that is to be converted. The essential purposes of the filter 112 is to remove the higher frequency introduced by the switch so as not to overload the amplifiers beyond the filter, and as was pointed out in the prior discussion of Fig. 1. The filter integrates the output of the switch 104 thereby providing a wave form which is directly related to the original curve as recorded in the trace being converted. The circuit of Fig. 4 also shows a buffer and output amplifier which is useful in a particular application of the present trace converter to provide for operation into a load isolated from ground and requiring a maximum current of about one half milliampere through an impedance about 150 ohms. The details of such an amplifier will vary with the application of the trace converter.

In order to improve the response of the scanning trace converter, consideration must be given to the imperfections in the tape on which the trace is drawn as well as to dirt and other marks which may produce spurious pulses from the detecting element of the trace converter. It is desirable that the instrument disregard, as far as possible, all pulses except those corresponding to the trace. A good approximation to this ideal condition can be achieved by a gating system inserted between amplifier 111 and the multivibrator 108, as shown in Fig. 7. This figure illustrates a slight modification of the diagram of Fig. 1 by including the pulse gating circuit. The gating system, shown alone in block diagram in Fig. 6, permits only those pulses to pass which occur immediately before or sometime after the instant in the scanning cycle which corresponds to the passage of the pulse through the switch in the previous scanning cycle.

In Fig. 6, the gate 605 passes pulses from a source of pulses only those of which bear a definite time relation to the preceding pulses. This input is introduced into the gating circuit through input 601 and in the present application provides that the pulses which occur at time when the scanning spot is within a certain distance of the center line of the tape are passed. The distance is chosen so that it will coincide with the maximum displacement of the trace from that center line. Gates 607 and 608 are opened and closed alternately, one gate being opened when the scanning spot is moving in one direction and the other gate being opened when the scanning is in the opposite direction. Gates 609 and 610 open just before the respective preceding gate and closes as soon as the pulse is passed. Pulses passing the gates 609 and 610 are combined by the adder 613 into the output 614. The operation of gate 605 is accomplished through the delay multivibrator 603 and the monostable multivibrator 604 by pulses received through the input 602 from a source of synchronizing pulses, in the present application from the pulse shaper and frequency doubler 412. Pulses from the pulse shaper, arriving just as the scanning spot reverses its motion, trigger the multivibrator 603 which after a certain time delay, determined by the time constant of the multivibrator circuit, reverts to its initial condition and produces a pulse to trigger the monostable multivibrator 604. The multivibrator 604 also reverts to its original condition after a certain fixed time. The time constant of multivibrator 603 is made equal to the time interval between the receipt of the pulse on input 602 and the instant at which the gate 605 is to be opened. The time constant of multivibrator 604 is made equal to the time it is desired to have the gate 605 remain open. Bias of the gate 605 is obtained from the multivibrator 604 so that the state of the multivibrator 604 determines whether the gate is opened or closed. The bias connection is made so that the gate is opened immediately after multivibrator 604 has been triggered and is closed when 604 has returned to its normal state.

The bi-stable mutlivibrator 606 is triggered from one of its states to the other by each pulse received on the input 602. The state of 606 determines the bias on the gates 607 and 608. These are arranged so that for one state of 606, gate 607 is opened and gate 608 is closed, while for the other state of 606, gate 607 is closed and gate 608 is opened. The monostable mutlivibrators 611 and 612 are triggered by pulses arriving on the input 601, and in the present application originate in the photocell 109, it being noted that only those pulses which have been passed by the corresponding preceding gates 609 and 610 reach multivibrators 611 and 612. The time constants of multivibrators 611 and 612 are slightly less than the time for a complete scanning cycle. These multivibrators bias gate 609 and 610 respectively so that each of these gates is closed by the triggering of its corresponding multivibrator and remains closed until the multivibrator returns to its normal state. In describing the operation of the gating circuits we shall refer to pulses from the photocell due to the interception of the scanning spot by the trace as signal impulses and to all other pulses produced by the photocell as noise pulses. Since in its present application a pulse from the pulse shaper 412 actuates the bistable multivibrators 606 between any two adjacent signal pulses, it is evident that alternate signal pulses will appear at the input of the gate 609 while the other signal pulses will appear at the input of the gate 610. It is supposed that initially gate 607 is open, gate 608 is closed and that gate 609 and 610 are both open, the first signal pulse passes through gate 609 causes it to close. Before the next signal pulse occurs, occurring on its return scan, gate 607 has closed and gate 608 has opened so that the pulse passes through gate 610 and causes it to close. All pulses are now blocked until gate 609 opens just before the expectant arrival of a signal pulse. This gate closes immediately after the pulse has passed. Similarly gate 10 will open just in time to pass the signal pulse generated on the return scan after which it also closes. The whole cycle will then be repeated.

If the trace is not parallel to the center line, one set of alternate signal pulses, say those passing through gate 609, will be separated in time by an interval which is slightly less than the scanning period, while the other signal pulses, passing through gate 610 will occur at intervals which are slightly greater than the scanning period. The difference between periods of the impulses and the scanning period will obviously increase with an increase in the slope of the trace. Thus the period of the monostable multivibrators 611 and 612 must be made sufficiently less than the period of the scanning cycle to assure that gate 609 and 610 open early enough to receive the signal pulses generated by scanning the trace in the region where the slope of the trace is a maximum.

A further understanding of the operation of the gating circuit of Fig. 6 may be gathered from a consideration of the time sequence of operations, illustrated in Figs. 8a and b, where the various functions are represented on a common time scale and from a common starting point. In Fig. 8a at Roman numeral I we have a sinusoidal representation of the displacement of the scanning spot with time as it intersects a portion of the trace 201 or 311 of Figs. 2 and 3 respectively. At Roman numeral II we have a cosine curve representing the voltage appearing at the switch 104, while at Roman numeral III we have represented a pulse output from the pulse shaper which appears on input 602 to the gating circuit, as was described in the foregoing description. The pulse appearing on 602 triggers the multivibrator 603. These pulses arriving on 602 just as the scanning spot reverses its motion. Multivibrators 603 and 604 after successive time delays revert to their normal condition and trigger the gate 605. As shown at Roman numeral V in Fig. 8a. At Roman numeral IV in Fig. 8a, there is shown above the reference line the time delay of vibrator 603 which is made equal to the time interval between the receipt of the pulses on the input 602 and the instant at which the gate 605 is to open while below the reference line there is shown the time delay of multivibrators 604 which is made equal to the time that is desired to have gate 605 remain open. Therefore for the time interval shown at Roman numeral V in Fig. 8 the gate 605 will pass any pulses received from the photocell on input 601. Those pulses appearing on input 601 that occur outside the time gate 605 is open will be rejected. This is shown at Roman numeral VI in Fig. 8a. At Roman numeral VII, the output from multivibrator 606 is assumed to be applied first to gate 607 so that gate 607 opens substantially coincident with the trigger appearing on input 602 and remains open until triggered by the succeeding pulse on 602, it then remains closed during the time gate 608, which is opened by the second pulse from the multivibrator 606, remain open. These are shown at Roman numerals VII and VIII in Fig. 8a. It will be noted that gate 607 remains open during the time in which the scanning spot is moving in one direction and that gate 608 is open during the time the scanning spot is moving in the opposite direction. It can therefore be seen that pulses appearing on 601 will be transmitted to the gate 609 or the gate 610 only if they occur during the time that gate 605 is open. If it is gate 607 which is open the pulse will be applied to gate 609. The pulse appearing at 609 triggers the multivibrator 611 which has a very long time delay which is just slightly less than the time of a complete scanning cycle. The multivibrator 611 then triggers the gate 609 to open for only a short portion of the cycle. The same is true for the gate 610 and multivibrator 612. In this system then the signal appearing on 601 can be passed to the output 614 only during a short time when the scan is adjacent to the position at which the preceding signal occurred.

Obviously many modifications and variations of the present invention are possible in the light of the above teachings. It is therefore to be understood that the invention may be practiced otherwise than as specifically described.

What is claimed as new and desired to be secured by Letters Patent of the United States is:

1. A trace converter having an optical system for scanning a trace on a moving tape comprising means for scanning a moving tape including means for detecting when the scan crosses a trace on said tape, means for driving said scanning means at a predetermined frequency, means connected to said driving means and controlled by said detecting means for gating a portion of the output of said driving means to provide an output for said converter corresponding to the instantaneous position of said trace in said scan.

2. A trace converter as claimed in claim 1 in which said scanning means includes an optical system having a source of light, first mirror connected to be oscillated by said driving means, means producing a spot of light from said source on said mirror, means to focus a spot of light from said mirrors on to the tape, said mirror being arranged to direct the light toward the tape, means focusing the light from said tape onto said detecting means.

3. A trace converter as claimed in claim 2 in which said optical system includes a second mirror having a curved reflecting surface, said second mirror being positioned to reflect light from said source onto said first mirror and to receive the light reflected from said first mirror, said second mirror also reflecting the light received from said first mirror onto said tape and reflecting the light reflected from the tape onto the said first mirror, said second mirror further receiving the light reflected back from the tape and said first mirror, means receiving the light reflected from said tape and said second mirror and reflecting it on to said detecting means.

4. A trace converter as claimed in claim 3 in which said second mirror is a segment of a sphere.

5. A trace converter as claimed in claim 3 in which said detecting means is a photosentitive element.

6. A trace converter as claimed in claim 1 in which said driving means includes a vibrating motor, an electronic oscillator means connected to drive said motor, phase shifter means connected to provide quadrature between the displacement of said scan and the output of said oscillator as applied to said gating means.

7. A trace converter comprising an optical system for use with a moving tape carrying a trace and having scanning mechanism for scanning said tape, said scanning mechanism including a means for sweeping a beam of light in a plane at right angles to the longitudinal axis of said tape, means for moving said tape at substantially constant rate past the plane of said beam, said beam executing substantially simple harmonic motion, photosensitive means for detecting when said beam intersects said trace, an electronic switch, means controlled by said photosensitive means for opening said switch, means for closing said switch at the start of the next scan, oscillator means applying a sinusoidal voltage to said switch said voltage being of the same frequency as said scan but in quadrature with the scan displacement, and means for integrating the output of said switch to produce an output for said trace converter.

8. A trace converter comprising an optical scanning system for scanning a trace on a moving tape, the scan of said scanning system having substantially a simple harmonic motion, an electronic switch, a source of sinusoidal voltage said voltage being applied to said switch, said voltage having the same frequency as said simple harmonic motion and being in quadrature with respect to the displacement of said scan, means opening said switch at the beginning of each scan, to pass a portion of the cycle of said means responsive to the intersection of said scan with said trace to effect the closing of said switch, means connected to said switch for filtering out the frequencies of said voltage above the frequency band required to pass the frequency of the trace and for integrating the segments of said voltage passed by said switch to produce an output for said trace converter corresponding to the trace.

9. In an optical trace converter, a scanning system for a moving tape containing a trace, said system having a scan moving in simple harmonic motion transverse to the direction of movement of the film, the combined motion of the scan and the tape producing a sinusoidal scanning of the tape, means producing a signal when said scan intercepts the trace, a gating system, means applying a voltage having a cosine wave form to said gate, means controlled by said signal from said scan to open said gate for the passage of said voltage and means integrating the output of said gate to produce an output signal for said trace converter which is proportional to the time integral of the trace.

10. A trace converter comprising, an optical scanning system for producing a scan of a trace on a moving tape, oscillator means producing a sinusoidal voltage output, the movement of said scan being synchronized with said sinusoidal voltage, means connected to said oscillator output for converting said sinusoidal voltage into a cosine voltage, means responsive to the intersection of said scan with said trace on the sweep of said scan in one direction for gating a portion of said oscillator output, means for gating a second portion of said oscillator output on the intersection of said scan with said trace on the return sweep of said scan in the opposite direction, means for integrating the portions of the cosine voltage passed by said gating means to produce an output voltage for said converter.

11. A trace converter having an optical system for use with a moving tape carrying a trace comprising, a source of light, a vibrating motor driven at substantially its natural frequency, a mirror vibrated by said motor, means for focusing the light from said source onto said mirror including an annular mirror, a segment of a spherical mirror having a concave reflecting surface positioned to receive the light from said source which light passes through the opening of the annular mirror, said spherical mirror being positioned to reflect the light onto said vibrating mirror and to receive the light reflected back from said vibrating mirror to reflect this light onto the surface to be scanned and to receive the light reflected back from said surface, said spherical mirror also reflecting said light from the surface back onto said vibrating mirror which in turn reflects said light from the surface onto the spherical mirror from which it is reflected to the annular reflecting surface by which it is focused onto said photo-sensitive element.

12. A trace converter comprising means for scanning a moving tape including means for producing an electrical signal when the scan intercepts a suitable marking on the tape, means for driving said scanning means at a predetermined frequency, means for shifting a portion of the output of said driving means in phase such that the portion is in quadrature with the displacement of the scan of said scanning means, means controlled by the output of said signal producing means for gating a portion of the output of said means for shifting, means connected between said means for producing and said gating means for limiting the response of said gating means to those signals occurring in the portion of the scan adjacent to that portion of the scan in which the preceding signal occurred, means for integrating the portion of the cosined voltage passed by said grating means to produce an output for said trace converter.

13. A trace converter as claimed in claim 9 in which the gating system includes a first gate, a first means triggered by a first input pulse for determining when said first gate should open, a second means triggered by said first means for determining how long said first gate is to remain open, means for introducing a second input pulse to said first gate, a second gate means connected to receive a pulse passed by said first gate, a third gate connected to receive a pulse passed by said first gate, a third means triggered for determining whether the second gate or the third gate will pass a pulse from said first gate, a fourth gate connected to receive a pulse passed by said second gate, a fourth means triggered by a pulse passed by said fourth gate and connected to close said fourth gate for a little less than the normal maximum time between pulses appearing at said means for introducing a second input pulse, a fifth gate connected to receive a pulse passed by said third gate, means triggered by a pulse passed by said fifth gate and connected to close said fifth gate for a little less than the normal maximum time between pulses appearing at said means for introducing a second input pulse, means connected to said fourth gate and to said fifth gate to provide an output for said gating system.

14. A trace converter comprising scanning means for scanning a moving tape including electroresponsive means for producing an electrical signal when the scanning means intercepts a suitable marking on the tape, driving means for driving said scanning means at a predetermined frequency, shifting means for shifting a portion of the output of said driving means in phase such that the portion is in quadrature with the displacement of the scan of said scanning means, limiting means controlled by the output of said electroresponsive means for gating a portion of the output of said shifting means, said limiting means including a first multivibrator having a preselected time constant, said multivibrator being triggered by a pulse generated from a quadratured portion of the output of said driving means, a second multivibrator triggered by reversion of said first multivibrator to its initial condition and having a preselected time constant, a first gate triggered by said second multivibrator and connected to pass any signal from said electroresponsive means, a third multivibrator triggered by the same pulse as said first multivibrator, said third multivibrator being bistable, a second gate connected to receive a signal from said first gate and to be opened by said third multivibrator when in one of its stable states, said limiting means electrically connected to said electroresponsive means for limiting the response of said first gate and second gate to those signals occurring in the portion of the scan adjacent to that portion of the scan in which the preceding signal occurred, integrating means for integrating the output of said gating means to produce the output of said trace converter.

15. A trace converter as claimed in claim 10 in which said optical scanning system for producing a scan includes a light source, a vibrating mirror, means focusing the light from said source on to said vibrating mirror, said mirror being driven by a vibrating motor, said motor being synchronized by being driven from said oscillator, said mirror focusing said light to a spot in the plane of said trace, a photoresponsive element and means focusing the light of said spot on said photoresponsive element.

References Cited in the file of this patent

UNITED STATES PATENTS

| | | |
|---|---|---|
| 1,640,393 | Coblentz | Aug. 30, 1927 |
| 2,376,235 | De Castro | May 15, 1945 |
| 2,403,986 | Lacy | July 16, 1946 |
| 2,441,226 | Phillips et al. | May 11, 1948 |
| 2,489,305 | McLennan | Nov. 29, 1949 |
| 2,491,591 | Sweeny et al. | Dec. 20, 1949 |
| 2,625,600 | Benaglio et al. | Jan. 13, 1953 |
| 2,674,916 | Smith | Apr. 13, 1954 |
| 2,680,240 | Greenfield | Jan. 1, 1956 |
| 2,782,307 | Von Sivers | Feb. 19, 1957 |
| 2,783,374 | Newman | Feb. 26, 1957 |